Figure 1:
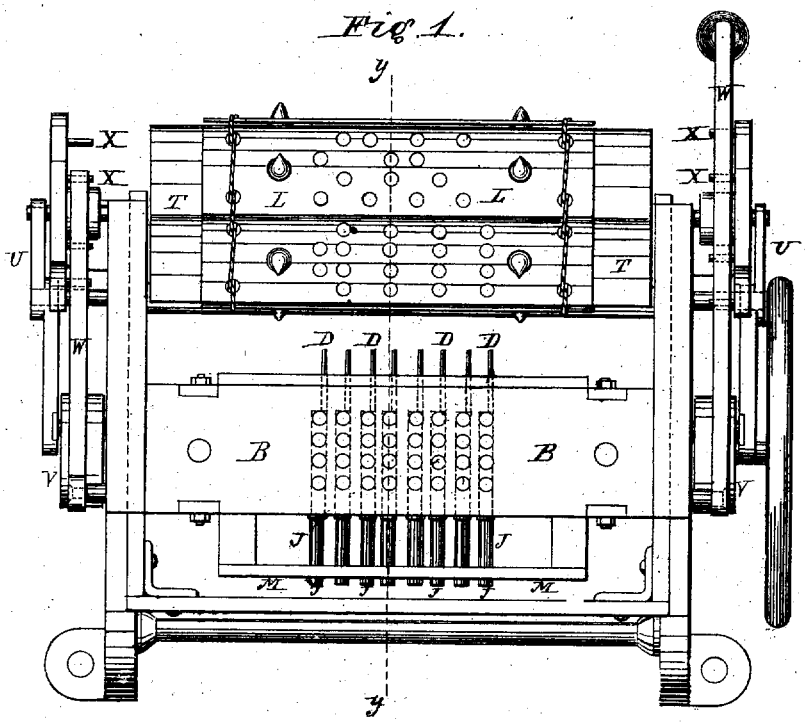

4 Sheets—Sheet 1.

L. A. UPSON.

MACHINES FOR PERFORATING PAPER.

No. 7,385. Reissued Nov. 7, 1876.

Witnesses.

Wendell R. Curtis

Wm H Ellsworth

Inventor

L. A. Upson by Thos. G. Ellis, Attorney

4 Sheets—Sheet 2.

L. A. UPSON.

MACHINES FOR PERFORATING PAPER.

No. 7,385. Reissued Nov. 7, 1876.

Witnesses.

Wendell R. Curtis

Wm. H. Ellsworth

Inventor.

L. A. Upson by Theo. G. Ellis Attorney

THE ECKERT LITHOGRAPHING CO. WASHINGTON, D. C.

4 Sheets—Sheet 3.

L. A. UPSON.

MACHINES FOR PERFORATING PAPER.

No. 7,385. Reissued Nov. 7, 1876.

Witnesses.

Wendell R. Curtis

Wm H Ellsworth

Inventor.

L. A. Upson by Theo G. Ellis, Attorney

THE ECKERT LITHOGRAPHING CO., WASHINGTON, D. C.

L. A. UPSON.

MACHINES FOR PERFORATING PAPER.

No. 7,385. Reissued Nov. 7, 1876.

Witnesses.

Wendell R. Curtis

Wm H Ellsworth

Inventor.

L A Upson by Thos. G. Ellis, Attorney

THE FICKERT LITHOGRAPHING CO., WASHINGTON, D. C.

UNITED STATES PATENT OFFICE

LYMAN A. UPSON, OF ENFIELD, CONNECTICUT.

IMPROVEMENT IN MACHINES FOR PERFORATING PAPER.

Specification forming part of Letters Patent No. 153,025, dated July 14, 1874; reissue No. 7,385, dated November 7, 1876; application filed December 11, 1875.

*To all whom it may concern:*

Be it known that I, LYMAN A. UPSON, of Enfield, in the county of Hartford and State of Connecticut, have invented a new and useful Improvement in Machines for Perforating Paper, of which the following is a specification:

My invention consists of a serial punching-machine, for perforating duplicate sets of pattern-cards for jacquard or figured weaving, and for perforating figures or designs for other purposes, in which the punches are arranged so that, for making different patterns, some of them may be permitted to rise and not perforate, while others are held so as to act, the material to be perforated being moved against the punches.

For readily effecting the changes which are necessary in the order of the operative punches for the great variety of patterns required, a hexagonal beam, termed a card-cylinder, carrying the pattern-cards of the pattern to be perforated, is combined with the punching mechanism, and is so contrived that the pattern-cards of the pattern to be perforated or duplicated move keys (which acts as stops to punches) from over the punches which are not to act, and allow them to rise and allow other keys to remain over those punches which are to act, and retain them in their working position; or the operation may be the reverse of this, moving keys over punches which are to act, and allowing the keys for punches which are not to act to remain stationary, and after each operation there is a plate so combined with the working of the perforated pattern-cards, and keys which act as stops to the punches, as to return all the keys to their first position for the selection from the whole by the next pattern-card, and thus cause the perforation to be made in accordance with the pattern to be duplicated, whatever it may be.

By this means any design or pattern can be perforated, or pattern-cards for figured weaving can be repeated, after the first set is made, very rapidly and much cheaper than they can by the present method of making them.

Figure 2:
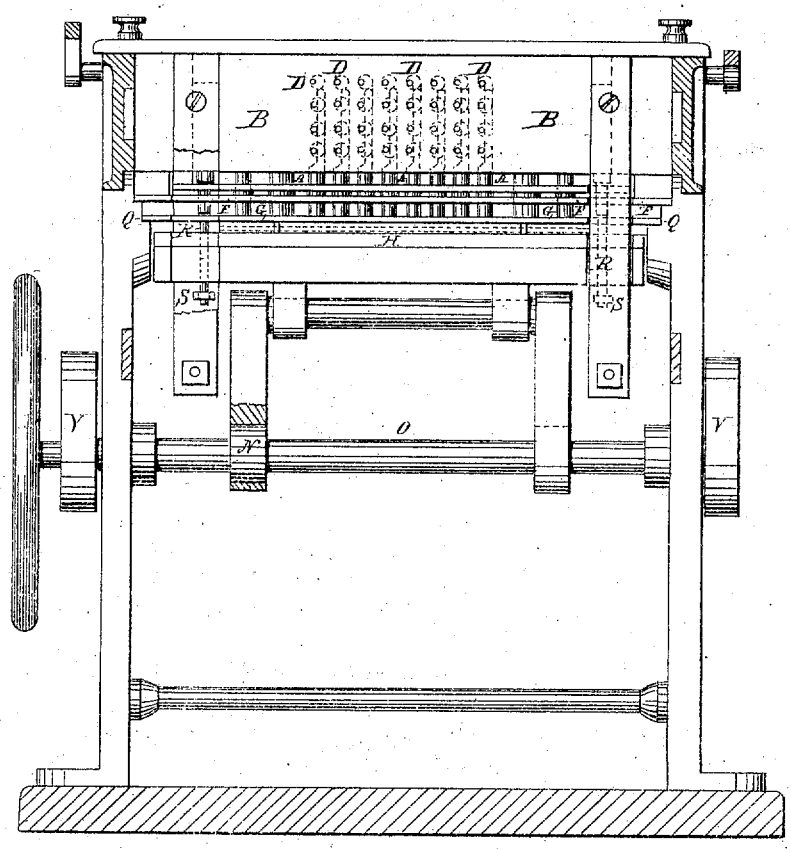
Figure 3:
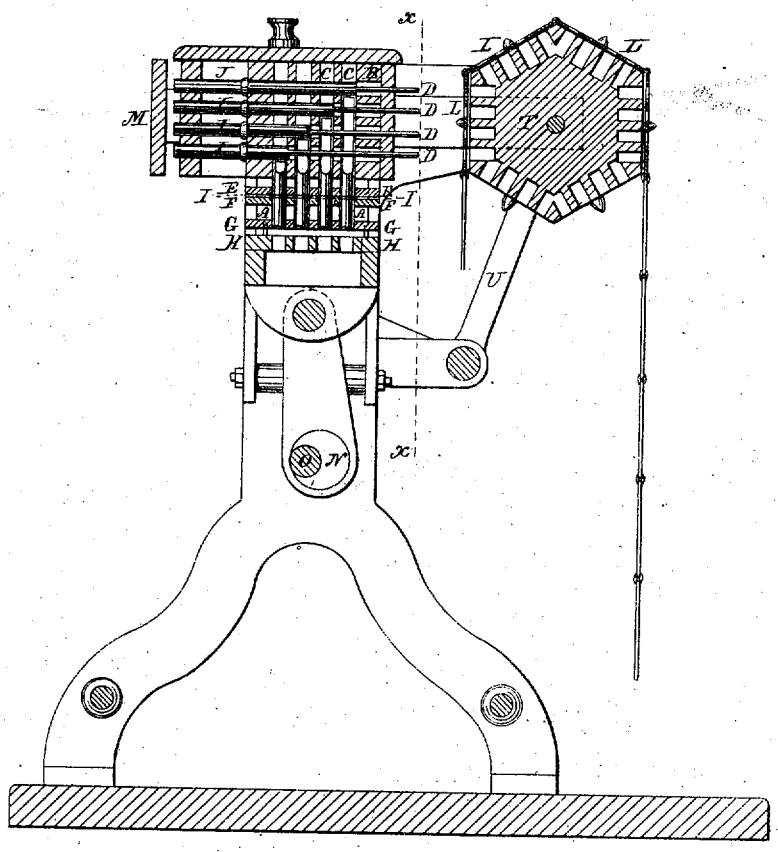
Figure 4:
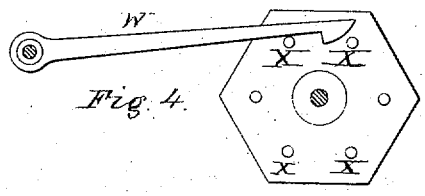
Figure 5:
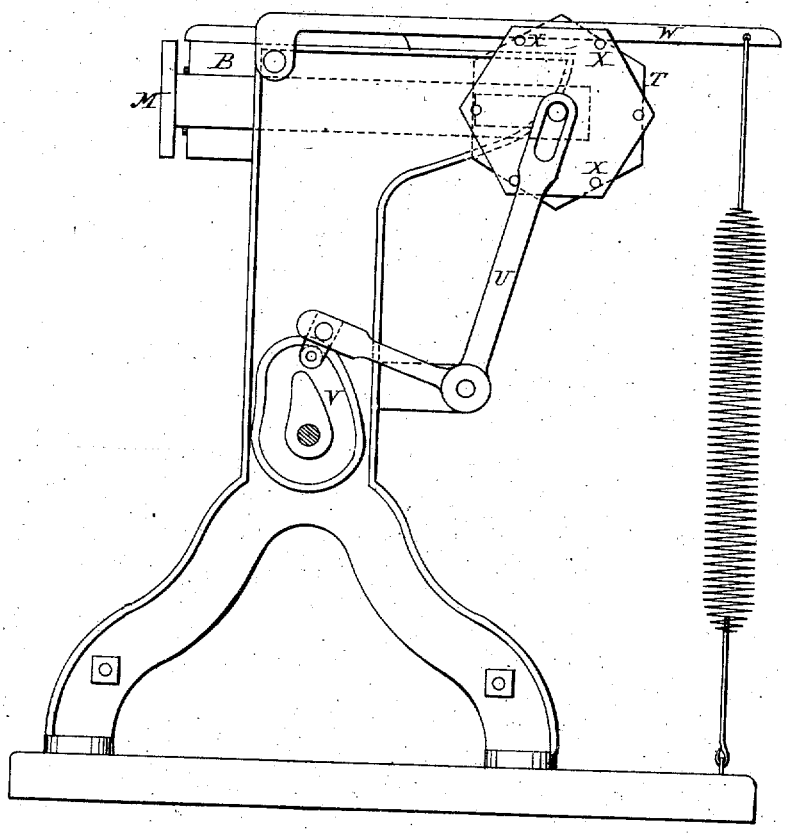

Figure 1 is a plan view of my improved perforating-machine. Fig. 2 is a sectional elevation taken on the line *xx* of Fig. 3. Fig. 3 is a sectional elevation taken on the line *y y* of Fig. 1. Fig. 4 is a detail of the mechanism for rotating the card-carrying cylinder. Fig. 5 is a side elevation.

Similar letters of reference indicate corresponding parts.

A represents a gang of punches, comprising as many as will be used for all the different patterns to be perforated, or pattern-cards to be duplicated. They are arranged vertically in a substantial beam, B, having suitable holes C bored to receive them from the under side. They are flattened on one side to pass the needles D, and project below the beam, through plates E F and a stripper, G, to a point a little above the die-plate H, and they have a collar, I, between the plates E and F, to be controlled by them. For each punch there is a key, consisting of the pin or rod J, attached to a wire or needle, D, extending beyond the beam B to the perforated card-cylinder, to hold the punch to its work when it is to perforate; the said keys being so arranged that when the pattern-cards L are operated against the keys by means of the perforated card-cylinder T, worked by the elbow-levers U and cams V on the driving-shaft O, they will move from over the punches that are not to act and remain over those that are.

The operation of the keys may be the reverse of the action here described, as hereinbefore shown.

M is a plate operating against the ends of the rods J to press them back into place after they have been pushed forward by the previous movement of the card-cylinder T. M is carried by the sliding frame which supports the cylinder T, and moves back and forth with it.

The object to be perforated is placed on the die-plate H and forced against the punches by the eccentrics N on the driving-shaft O, and it is discharged from the punches by the stripper-plate G, Fig. 3, which is lifted from its rest, Q, Fig. 2, by the die-plate when the object to be perforated is presented to the punches; and it is pulled down again to said rest, when the die-plate goes down, by the shouldered rods R, which pass through the plate and are adjusted for a little vertical play, having a nut, S, at the lower end, so that just before the die-plate comes to the end of its movement it pulls the stripper down by means of the rods and nuts. The plate F is a stationary guide for the punches, and it also prevents them, by means of the collars I, from falling too low. E is a movable plate to pull down the punches in case they may stick, so that the keys can get back over them. This plate is also pulled down by the rods R, which are shouldered above it, in the same manner as in respect to the stripper-plate. The perforated card-cylinder T, which carries the belt of pattern-cards, is operated forward and back by the elbow-levers U and cams V, and turned and held in position by the pawls and levers W and pins X. In practice it may be much longer than the breadth of the punching apparatus; so that, when the pattern-card belt is composed of two or more sets of cards, placed side by side, and the cards wired together (as they are used in looms) when wishing to make duplicates, the belt can be put on the card-cylinder entire, and after running one set of cards as long as desired it can be shifted along the cylinder lengthwise to use another set, and thus save the labor of detaching the different sets from each other.

Having thus described my invention, I claim as new and desire to secure by Letters Patent—

1. A punching mechanism consisting of a series of punches and locking-pins, in which the latter are acted directly, and without intervening devices, upon by a previously-perforated pattern-card, in such a manner as to hold or release the punches and reproduce the pattern, substantially as herein set forth.

2. The combination of a pattern-card with needles acting directly as locking-pins to the punches, without intervening devices, substantially as herein described.

3. The combination of the movable adjusting-plates E and M with the punches and locking-pins, to return the said parts to their proper positions, substantially as described.

4. The combination of the shouldered rods R with the reciprocating die-plate H, for operating the returning-plate E, and the stripper G, substantially as described.

LYMAN A. UPSON.

Witnesses:
THEO. G. ELLIS,
J. E. PALMER.